United States Patent
Chen et al.

(10) Patent No.: US 10,629,043 B1
(45) Date of Patent: Apr. 21, 2020

(54) SYSTEM AND METHOD TO AVOID HEATSTROKE IN VEHICLES

(71) Applicants: Changhai Chen, Bloomfield Hills, MI (US); Daniel Chen, Chicago, IL (US); Michael Chen, Dublin, CA (US)

(72) Inventors: Changhai Chen, Bloomfield Hills, MI (US); Daniel Chen, Chicago, IL (US); Michael Chen, Dublin, CA (US)

(*) Notice: Subject to any disclaimer, the term of this patent is extended or adjusted under 35 U.S.C. 154(b) by 29 days.

(21) Appl. No.: 16/214,200

(22) Filed: Dec. 10, 2018

Related U.S. Application Data

(63) Continuation of application No. 16/172,827, filed on Oct. 28, 2018, now abandoned.

(60) Provisional application No. 62/578,454, filed on Oct. 29, 2017.

(51) Int. Cl.
| | |
|---|---|
| *G08B 21/00* | (2006.01) |
| *G08B 21/02* | (2006.01) |
| *B60W 10/30* | (2006.01) |
| *B60H 1/00* | (2006.01) |
| *G01J 5/10* | (2006.01) |
| *G01K 7/02* | (2006.01) |

(52) U.S. Cl.
CPC ......... *G08B 21/02* (2013.01); *B60H 1/00742* (2013.01); *B60H 1/00978* (2013.01); *B60W 10/30* (2013.01); *G01J 5/10* (2013.01); *G01K 7/02* (2013.01); *B60W 2420/00* (2013.01); *G01J 2005/106* (2013.01)

(58) Field of Classification Search
CPC ............. G08B 21/02; B60H 1/00742; B60H 1/00978; B60W 10/30; G01J 5/10; G01K 7/02
USPC ....................................................... 340/573.1
See application file for complete search history.

(56) References Cited

U.S. PATENT DOCUMENTS

| | | | | |
|---|---|---|---|---|
| 2004/0074244 | A1* | 4/2004 | Ichishi | G06K 9/00845 62/186 |
| 2014/0169404 | A1* | 6/2014 | Lam | B60N 2/002 374/179 |
| 2015/0025738 | A1* | 1/2015 | Tumas | B60H 1/00742 701/36 |
| 2015/0313475 | A1* | 11/2015 | Benson | A61B 5/6893 297/217.3 |
| 2017/0088098 | A1* | 3/2017 | Frank | G06K 9/00362 |
| 2017/0158186 | A1* | 6/2017 | Soifer | B60H 1/00742 |

* cited by examiner

*Primary Examiner* — Mark S Rushing

(57) ABSTRACT

Systems and methods are provided to detect and issue warning signal when an occupant(s) inside a dangerous vehicle. An exemplary system and method may include operations and/or instructions comprising measuring temperature at multiple zones; calculating temperature gradients versus time and space; calculating distances among temperatures and among temperature gradients; analyzing temperatures, temperature gradients, distances and their histories to detecting an occupant(s) inside a vehicle; and giving out warning alarms when an occupant(s) inside the vehicle.

12 Claims, 6 Drawing Sheets

SYSTEM AND METHOD TO AVOID HEATSTROKE IN VEHICLES

CROSS-REFERENCE TO RELATED APPLICATION

This non-provisional application is a continuation of and claims priority to U.S. Non-Provisional patent application Ser. No. 16/172,827 filed Oct. 28, 2018, which claims priority to U.S. Provisional Patent Application No. 62/578,454 filed Oct. 29, 2017. All of the above-referenced applications are hereby incorporated by reference in their entirety.

BACKGROUND

More than 740 children have died in vehicles due to heatstroke since 1998 in US alone. Among these 740 children, 376 children (54%) were accidently forgotten by caregivers. Other 364 children (45%) gained access on their own or were intentionally left in vehicles. The heatstroke death also occurs in other cases, e.g. older, handicapped, infirm people and pets. There have been numerous attempts to develop warning systems. Many solutions, like the various types of car seat monitoring devices, may fail to address the root causes of the problem. There is no known reliable device and method on the market to give warning signals when occupants inside hot cars.

Therefore, a need in the field exists for a solution that can reliably detect an occupant in hot vehicle and other dangerous situations and give warning signals.

BRIEF DESCRIPTION OF THE DRAWINGS

The above, as well as other advantages of the present disclosure will become readily apparent to those skilled in the art from the following detailed description when considered in light of the accompanying drawings, in which.

DETAILED DESCRIPTION

Figure 1:
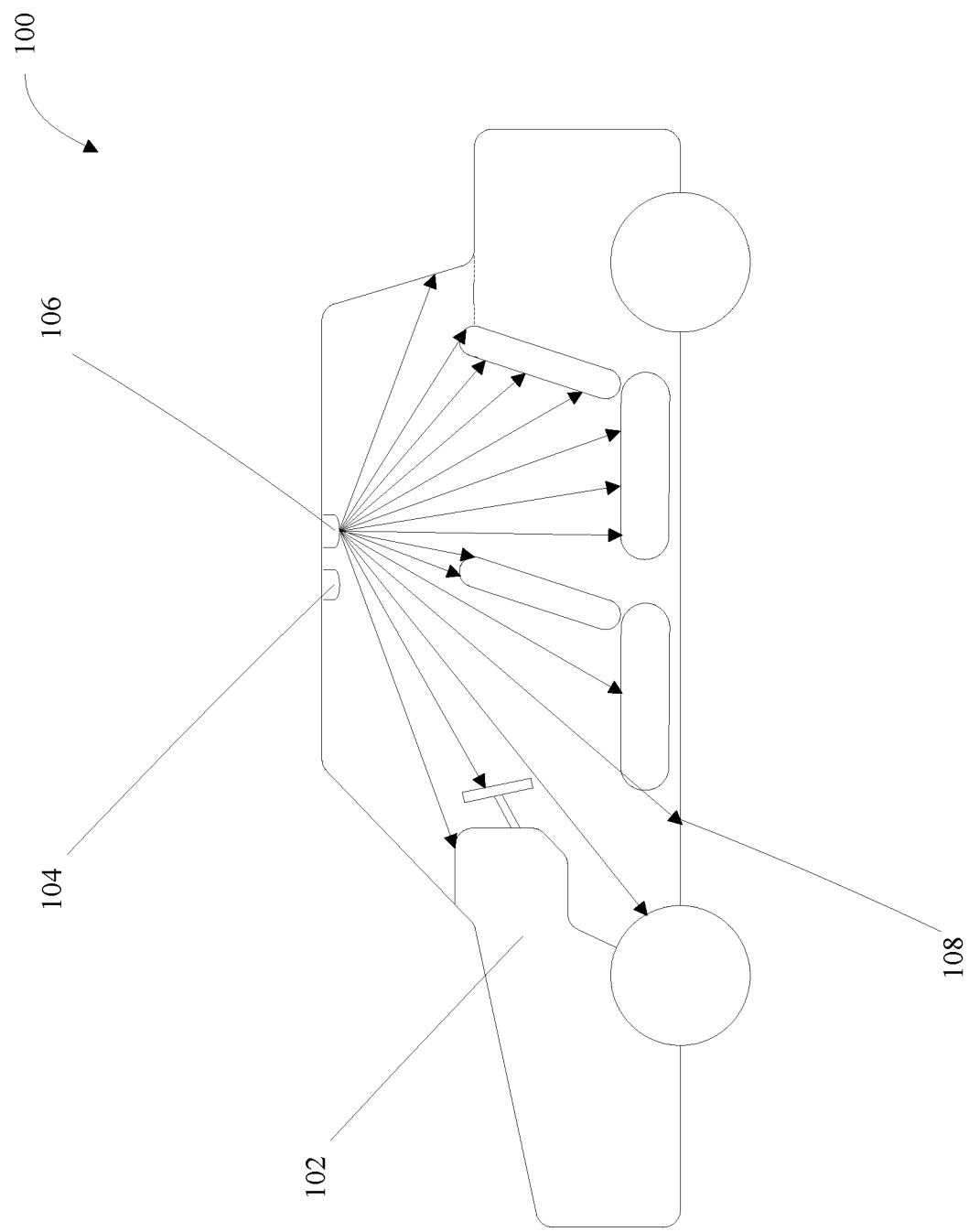
FIG. 1 is a perspective view of an exemplary system.

The present disclosure relates to devices to detect an occupant inside a hot or cold vehicle and give warning alarms.

The present disclosure includes a system and method and a set of devices which, when used together, will detect and notify people that an occupant is inside a dangerous vehicle.

Further areas of applicability will become apparent from the description provided herein. It should be understood that the description and specific examples are intended for purposes of illustration only and are not intended to limit the scope of present disclosure.

The following description is merely exemplary in nature and is not intended to limit the present disclosure, application, or uses. It should be understood that throughout the drawings, corresponding reference numerals indicate corresponding parts and features. The terms "device," "unit" and "module" may be used interchangeably. The terms "occupant" means any person or pets. The term "vehicle" means any form of automobiles, e.g. cars, SUV, bus, or vans.

Referring now to the figures, FIG. 1 illustrates an exemplary system 100 that is configured to measure temperature at multiple points inside a vehicle and detect an occupant. The system 100 may include a vehicle 102, a camera system with lighting source 104, a temperature monitor system 106, and multiple measurement zones 108. The temperature measurement system 106 may include a power module 210, a multi point temperature measurement unit 212, an ambient temperature measurement unit 214, a camera with lighting source 104, other sensing units 218, a processor 222, a memory 224 with a program stored thereon, a display 220, at least one input/output (I/O) device 230, and a communication device 228, as described in more detail with respect to FIG. 2.

Figure 2:
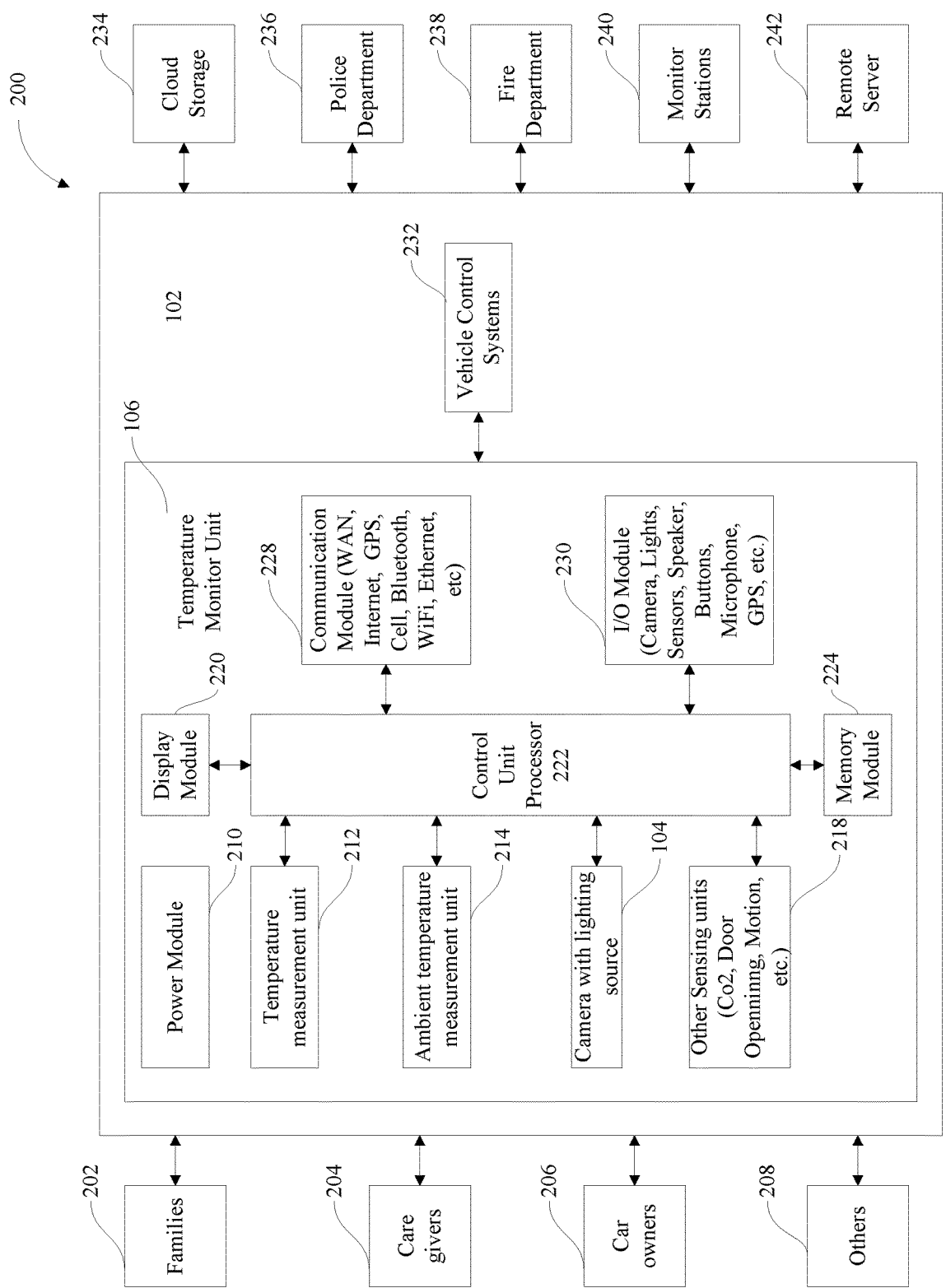
FIG. 2 is a schematic block diagram illustrating an exemplary system.

Referring now to FIG. 2, a schematic diagram of a system 200 of the interaction between system 100, users 202-208, and emergency responders or monitor stations 234-242. The users may include, but are not limited to, family member(s) 202, caregiver(s) 204, vehicle owner(s) 206, and other(s) 208. The emergency responders or monitor stations may include, but are not limited to, cloud storage 234, police department(s) 236, fire department(s) 238, monitor station(s) 240, and remote server(s) 242.

System 200 may include system 100, including a hardware structure of the temperature monitor unit 106. The hardware structure may include control unit or processor 222, memory module 224, display unit 220, I/O device(s) 230, communication device 228, and a power device 210. The processor 222 may be any type of general or specific purpose processor, including, but not limited to, a micro controller. The power device 210 may be configured to any DC power, such as a lithium ion battery system. If the system 100 uses rechargeable batteries, the power source may monitor the power remaining and give reminder signals to recharge batteries once the batteries are low. The memory 224 may store temperature values and other information. The I/O device 230 may include, but is not limited to one or more cameras, one or more lights, one or more sensors, one or more speakers, one or more buttons, microphone, GPS device, or a combination thereof.

The communication device 228 may communicatively connect the devices of system 102, for example, using any type of wired or wireless network connection. The communication device 228 may include a single transceiver or a combination of transmitters and receivers. The wireless network may utilize a wireless transmitter (e.g., cellular, or Wi-Fi transmitter) of the communication device 228. The communication device 228 may be used for digital or analog signal transfers. The communication device 228 may include any technology that implements a wireless exchange of occupant information by converting propagating electromagnetic waves to and from conducted electrical signals. The communication device 228 may include any technology that is used to exchange information wirelessly using radio waves over a radio range or network that enables communication.

Any portion of system 100 or 200, may include a computing system and/or device that includes a processor 222, memory 224 and communication 228. Computing systems and/or devices generally include computer-executable instructions, where the instructions may be executable by one or more devices.

In general, computing systems and/or devices may employ any of a number of computer operating systems Further, processor 222 may include a microprocessor. Processor 222 may receive instructions from memories such as memory 224, car control system 232, remote server 242, or cloud storage 234 and execute the instructions, thereby performing one or more operations or processes including those described herein. Such instructions and other information may be stored and transmitted using a variety of computer-readable mediums (e.g., memory 224, car control system 232, or cloud storage 234). Processors such as processor 222 may include any computer hardware or combination of computer hardware that is configured to accomplish the purpose of the devices, systems, and processes described herein. For example, the processor 222 may be any one of, but not limited to single, dual, triple, or quad core microprocessors (on one single chip), graphics processing devices, visual processing devices, and virtual processors.

Memories such as memory 224 or car control system 232 may include, in general, any computer-readable medium (also referred to as a processor-readable medium) that may include any non-transitory (e.g., tangible) medium that participates in providing information or instructions that may be read by a computer (e.g., by the processors 222).

Temperature measurement unit 212 may include any types, contact or non contact, temperature sensor that measures temperature. The temperature sensor(s) may be fixed or mounted on a device that moves to measure temperature at multiple points. The temperature sensor may include infrared thermometer, thermocouples, thermopile arrays, infrared arrays or any combinations of them.

The temperature measurement unit 212 measures temperature at multiple points simultaneously or sequentially. The temperature measurement unit 212 divides the interior of a vehicle into different zones and measures temperatures at some zones. Those divisions of zones may or may not be fixed, the temperature measurement unit 212 may change zone divisions for different measurement cycles. Those zones may have different size, shape, space orientation, and space angle. Those zones may not connect to each other. Those zones may not cover the whole interior of the vehicle. Those zones may have irregular space shape and angle. The surfaces at those zones may have different shape, space orientation and angle, and size. One zone may have multiple surfaces that may have different size, shape, space orientation, and space angle.

Ambient temperature sensor 214 may include any type temperature sensor that may measure ambient temperature inside a vehicle. The temperature measurement 212 and the ambient temperature sensor 214 may not be separated devices. They may be the same device.

Vehicle control systems 232 may include any type controls installed on the vehicle.

Cloud storage 234 and remote server 242 may store program or other information for the temperature monitor unit. Police department 236, fire department 238, and monitor stations 240 may respond to warning alarms issued by the temperature monitor unit 106.

Figure 3:
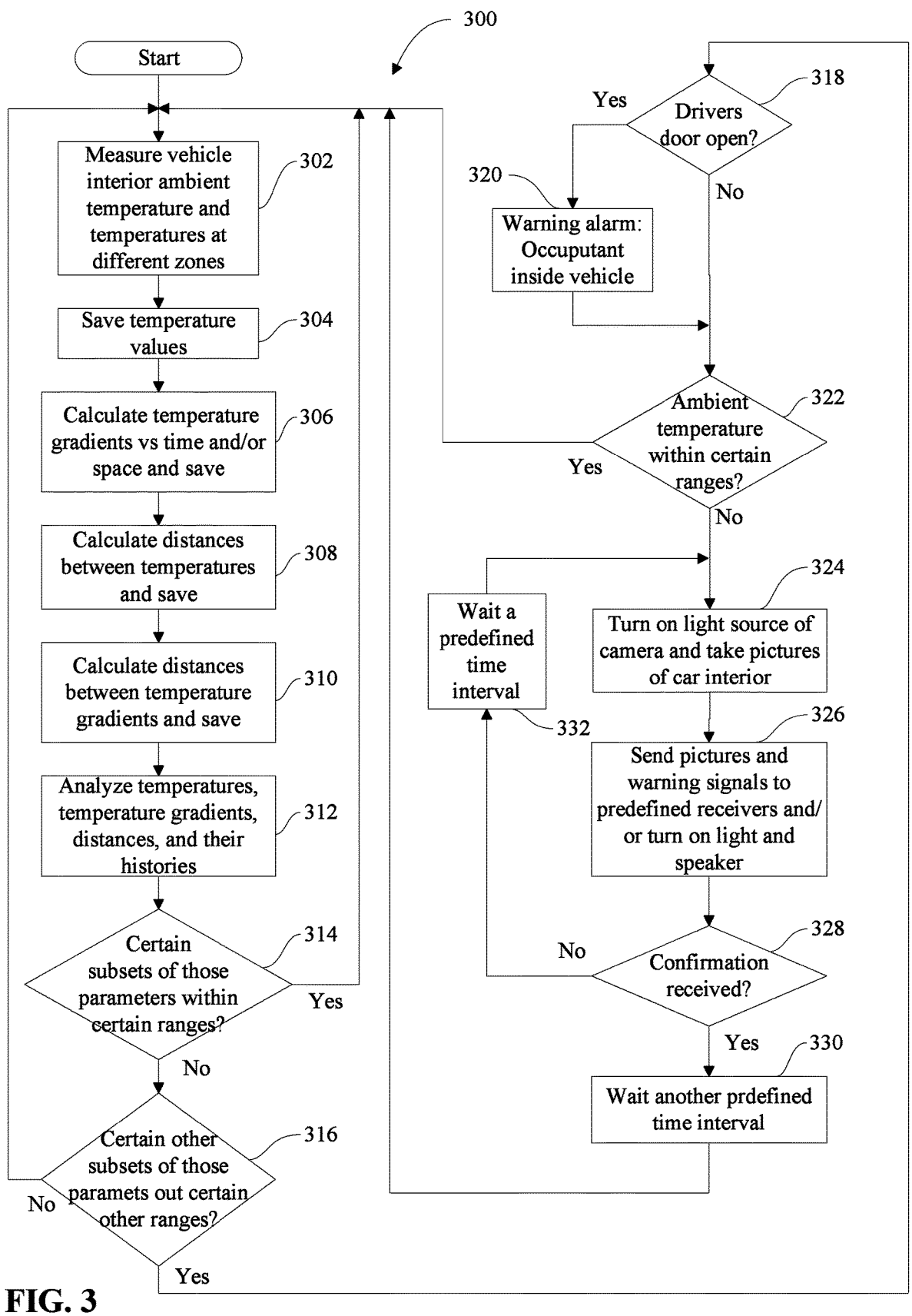
FIG. 3 is a flow diagram illustrating an exemplary process.

Referring now to FIG. 3, a flow diagram of an exemplary process 300 is illustrated.

Process 300 may include operations that may be part of program stored on memory 224, and/or executed by processor 222. Process 300 may take many different forms and include multiple and/or alternate steps. While an exemplary process is shown, the exemplary steps illustrated are not intended to be limiting. Indeed, additional or alternative steps and/or implementations may be used.

Process 300 may begin at block 302 at which the system may measures vehicle interior ambient temperature and temperature at different zones.

At block 304, the system may save all measured temperature values into memory module 224 and/or database.

At block 306, the system may calculate temperature gradients versus time and save into memory module 224 and/or database. The system may calculate temperature gradient versus time at different zones and save them into memory module 224 and/or database. The time gradients indicate temperature changes with time at different zones. The time gradients indicate how fast the temperature increases, or decreases, or fluctuates with time at different zones. The system may also calculate temperature gradients versus space at the same measuring time or the same measuring cycle and save them into memory module 224 and/or database. The space gradients indicate temperature changes among different zones. The space gradients indicate temperature distributions inside the vehicle at a given time point. The system may also calculate temperature gradients versus space at different measuring times or different measuring cycles and save them into memory module 224 and/or database. The space gradient with different times may indicate temperature changes verse time and space.

At block 308, the system may calculate distances among temperatures and save the results into memory module 224 and/or database.

At block 310, the system may calculate distances among temperature gradients and save them into memory module 224 and/or database.

At block 312, the system may analyze the temperatures, the temperature gradients, and distances and their histories.

At block 314, the system may determine if some subsets of the temperatures, temperature gradients, distances, and their histories are within certain ranges. The ranges for different subsets may not be the same. If they are within certain ranges, then process 300 may proceed to block 302 described above. If they are not within certain ranges, then process 300 may proceed to block 316.

At block 316, the system may determine if some subsets of the temperatures, temperature gradients, distances, and their histories (these subsets may not be the same subsets as in block 314) are within certain ranges (again these ranges may not be the same as in block 314). The ranges for different subsets may not be the same. If they are within certain ranges, then process 300 may proceed to block 318. If not, then process 300 may proceed to block 302 described above. Blocks 314 and 316 determine an occupant or occupants are inside the vehicle. The system may also determine the locations of the occupant(s), e.g. on passenger seat, on back seat, on back floor, etc.

At block 318, the system may determine if the driver side door is open. If the drive side door is open, then the process 300 may proceed to block 320. If not, then the process may proceed to block 322.

At block 320, when the driver side door is open, the system may give a warning signal "an occupant is in the car" to remind the driver. The warning signal may take any forms, speaker, lights, display, etc.

At block 322, the system may determine if the vehicle ambient temperature is within a certain range. If it is, then process 300 may proceed back to block 302 described above. If it is not, the process 300 may proceed to block 324.

At block 324, the system may turn on the light for the camera and the camera may take pictures or videos for the interior of the vehicle.

At block 326, the system may send the pictures or videos and other warning signals to predefined receivers via communication module 228, e.g. police department, fire department, vehicle owner, friends, caregiver, monitor stations, etc. The system may also roll down windows, turn on air conditioner, turn on lights, speaker, etc.

At block 328, the system may determine if a confirmation is received from one of predetermined receivers. If a confirmation is received, then the process 300 may proceed block 330. If a confirmation is not received, then the process 300 may proceed block 332.

At block 330, after receiving a confirmation from one of predefined receivers, the system may wait a predefined time interval, then proceed back to block 302 described above.

At block 332, after a predefined time interval, if the system does not receive a confirmation from one of predefined receivers, then the process 300 may proceed back to block 324 described above.

Process 300 repeats from block 302 to block 332 continuously.

Figure 4:
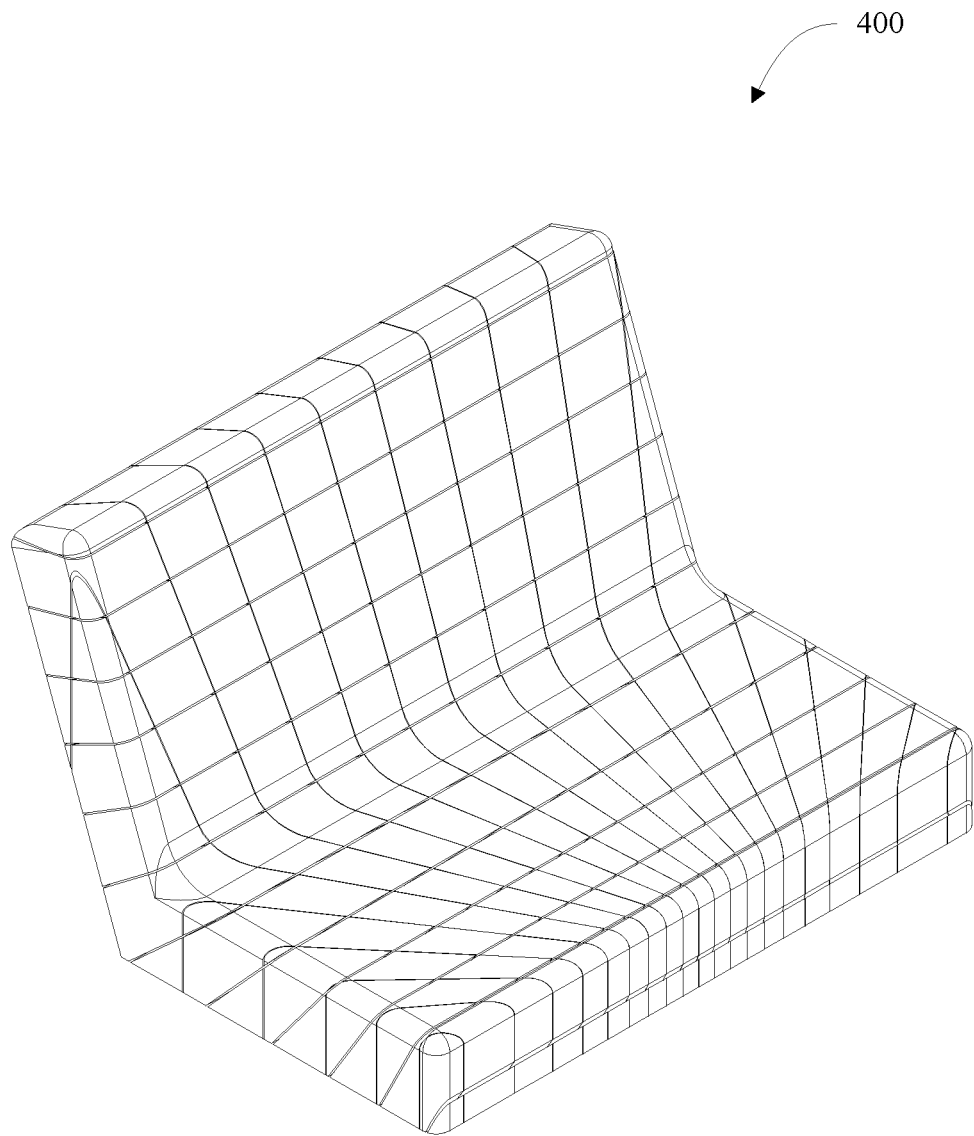
FIG. 4 illustrates zoning of a vehicle seat.

FIG. 4 illustrates an exemplary zoning for the interior of a vehicle, particularly zoning for a back seat. The temperature monitor unit 106 may divide the interior of the vehicle into multiple zones and measures temperatures. The zoning may change with different cycles of temperature measurement. Zones may be three dimensional. Those zones may have different size, shape, space orientation, and space angle. Those zones may not connect to each other. Those zones may have irregular space shape and angle. The surfaces at those zones may have different shape, space orientation and angle, and size. One zone may have multiple surfaces that may have different size, shape, space orientation, and space angle.

Figure 5:
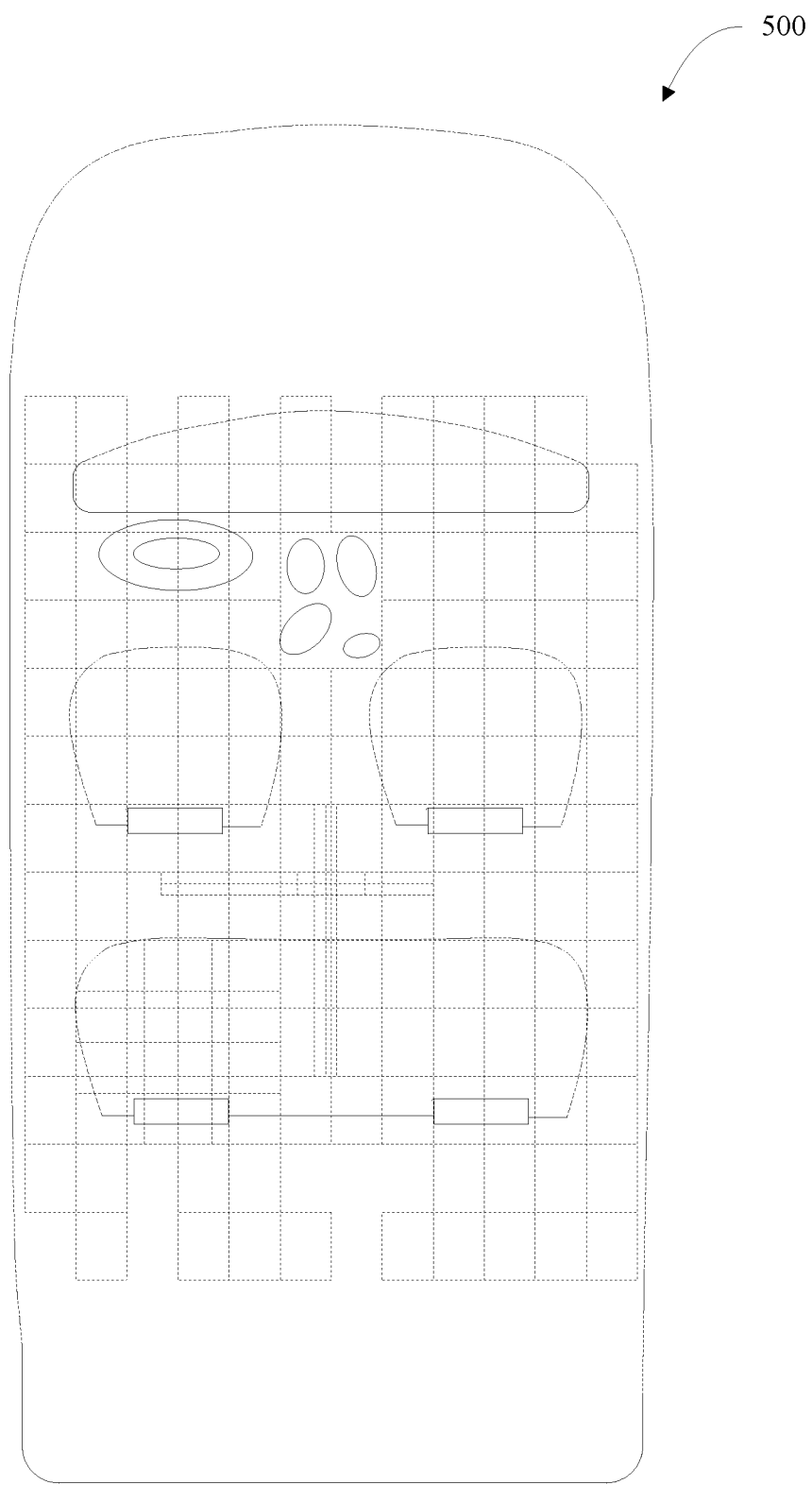
FIG. 5 illustrates interior of a vehicle.

FIG. 5 illustrates an exemplary zoning for the interior of a vehicle. A flattened zoning of the interior of a vehicle is shown.

Figure 6:
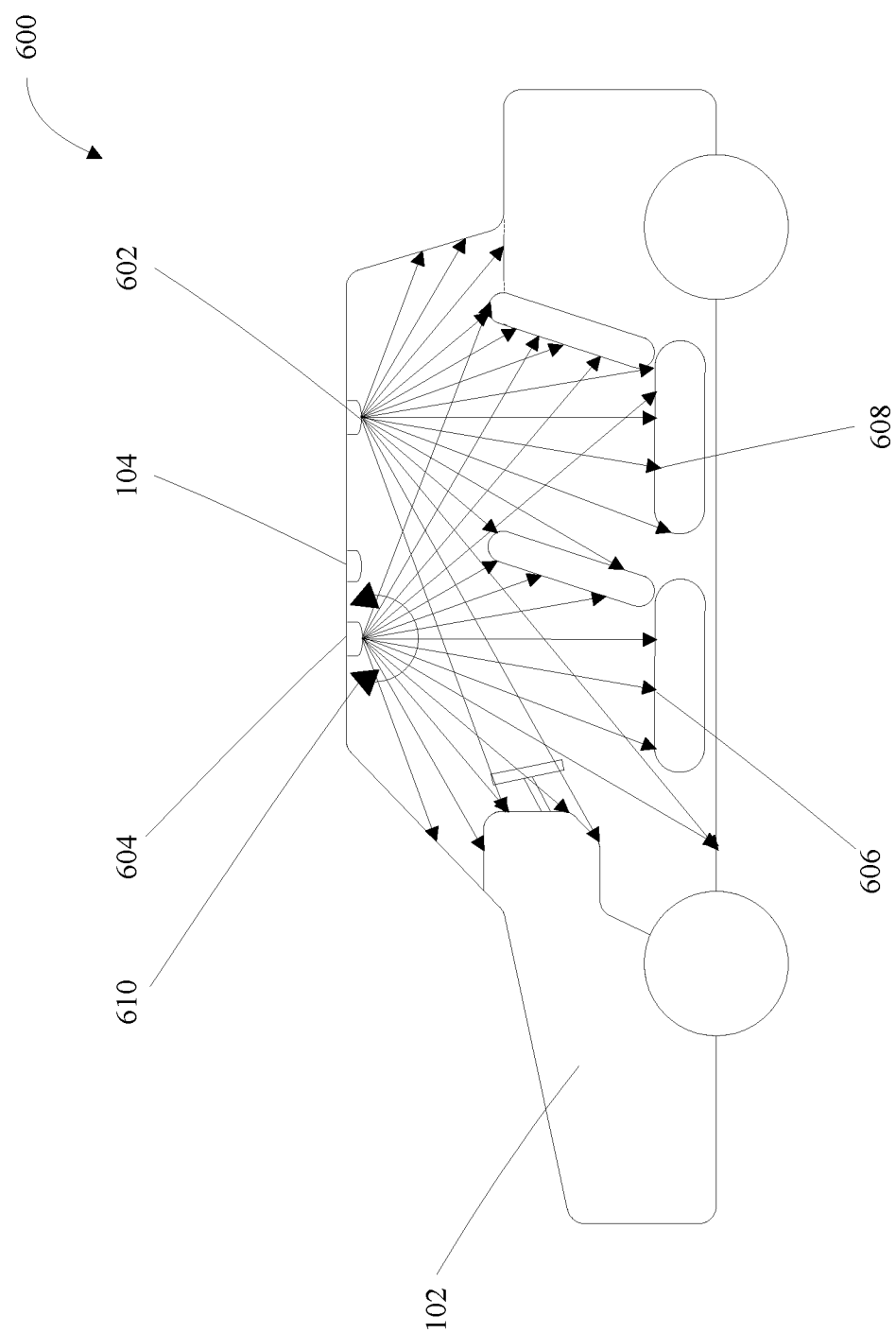
FIG. 6 a perspective view of a system according to another exemplary approach.

FIG. 6 illustrates an exemplary of monitor system with two temperature monitor units 602 and 604. In this example the temperature monitor unit 602 measures zones 608 and the temperature monitor unit 604 measures zones 606. The temperature monitor units 602 and 604 may measure the same zones 608. They may measure the same way or differently, e.g. units 602 and 604 both measure the same zones 608 but from different angles. In this example the temperature monitor unit 604 is mounted on device 610. The device 610 may move the temperature monitor unit 604 for temperature measurement. The device 610 may have any types movements, linear, or rotate, or the combinations of both. The temperature monitor units may mounted in any locations, e.g, one on the ceiling and the others on the wall. The temperature monitor units 602 and 604 may not be separated devices. They may be the same physical device with different features.

Systems and methods are provided for detecting and warning an occupant(s) left in a dangerous vehicle. An exemplary system and method may include operations and/or instructions comprising measuring temperature for multiple zones inside a vehicle and saving them; calculating temperature gradients versus time and/or space and their histories; further calculating distances for the temperatures and temperature gradients and their histories; analyzing those parameters and determining an occupant(s) left in vehicle; and send warning signals to predefined receivers and taking predefined actions.

A system for monitoring an occupant(s) in vehicle including at least one temperature monitor unit, the temperature monitor unit having a temperature measurement unit that measures temperatures at multiple zones. The temperature monitor unit configured to divide the interior of a vehicle into multiple zones. The system also includes a camera system to take pictures or videos to reduce false alarms when the system detects an occupant(s) left in vehicle. The system is further configured to take actions when it detects an occupant(s) left in vehicle. The system configured to send warning signal to predefined receivers and turn on air conditioner and taking other actions.

It will be appreciated by those skilled in the art that the present invention may be embodied in other specific forms without departing from the spirit or essential character thereof. The described embodiments are therefore considered in all respects to be illustrative not restrictive. The scope of the invention is indicated by the appended clauses, not the foregoing description, and all changes that come within the meaning and range of equivalents thereof are intended to be embraced therein.

What is claimed is:

1. A system to detect and warn an occupant(s) in a vehicle, comprising:
   at least one of multiple point temperature measurement unit;
   at least one of ambient temperature measurement unit;
   a camera system; and
   a controller configured to
      divide the interior of a vehicle into multiple zones;
      measure temperatures at different zones;
      calculate temperature gradients;
      analyze the temperatures, the temperature gradients, and their histories to detect occupant; and
      give out warning alarms if an occupant(s) found and ambient temperature is out of certain range.

2. The system of claim 1, wherein the multiple point temperature measurement unit includes at least one thermopile array sensor.

3. The system of claim 2, wherein the thermopile array sensor configured to divide interior of the vehicle into multiple zones.

4. The system of claim 2, wherein the thermopile array sensor configured to measure temperatures at different zones.

5. The system of claim 1, wherein the multiple point temperature measurement unit includes at least one infrared array sensor.

6. The system of claim 5, wherein the infrared array sensor configured to divide interior of the vehicle into multiple zones.

7. The system of claim 5, wherein the infrared array sensor configured to measure temperatures at different zones.

8. The system of claim 1, wherein the multiple point temperature unit includes a infrared sensor.

9. The system of claim 8, the infrared sensor configured to scan the interior of a vehicle to measure temperatures at different zones.

10. The system of claim 1, the ambient temperature measurement unit configured to measure ambient temperature.

11. The system of claim 1, wherein the camera system configured to take pictures or videos of interior of the vehicle if an occupant(s) found and ambient temperature is out of certain range.

12. A method to detect and warn an occupant(s) in a vehicle comprising:
   dividing the interior of a vehicle into multiple zones;
   measuring temperatures at different zones;

calculating temperature gradients;
analyzing the temperatures, the temperature gradients, and their histories to detect occupant; and
giving out warning alarms if an occupant(s) found and ambient temperature is out of certain range.

* * * * *